United States Patent
Burch et al.

(10) Patent No.: US 10,171,470 B2
(45) Date of Patent: *Jan. 1, 2019

(54) TECHNIQUES FOR SECURE DEBUGGING AND MONITORING

(71) Applicant: NetIQ Corporation, Provo, UT (US)

(72) Inventors: Lloyd Leon Burch, Payson, UT (US); Carolyn B. McClain, Springville, UT (US); Robert Skousen Stilmar, Payson, UT (US); Dipto Chakravarty, Potomac, MD (US); Baha Masoud, Orem, UT (US); Michael F. Angelo, Spring, TX (US)

(73) Assignee: NetIQ Corporation, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,165

(22) Filed: Jul. 31, 2017

(65) Prior Publication Data

US 2017/0353464 A1 Dec. 7, 2017

Related U.S. Application Data

(63) Continuation of application No. 14/867,255, filed on Sep. 28, 2015, now Pat. No. 9,723,007, which is a continuation of application No. 13/728,224, filed on Dec. 27, 2012, now Pat. No. 9,172,701.

(51) Int. Cl.
| | |
|---|---|
| *H04L 29/06* | (2006.01) |
| *G06F 21/00* | (2013.01) |
| *G06F 21/60* | (2013.01) |
| *G01R 31/317* | (2006.01) |

(52) U.S. Cl.
CPC ........ *H04L 63/10* (2013.01); *G01R 31/31705* (2013.01); *G06F 21/00* (2013.01); *G06F 21/606* (2013.01); *H04L 63/0428* (2013.01)

(58) Field of Classification Search
CPC .................................. G06F 21/00; H04L 63/10
See application file for complete search history.

(56) References Cited

U.S. PATENT DOCUMENTS

| | | | |
|---|---|---|---|
| 6,742,177 B1 | 5/2004 | Dorak, Jr. et al. | |
| 7,774,758 B2 | 8/2010 | Nardini et al. | |
| 8,266,684 B2 | 9/2012 | Kline et al. | |
| 9,723,007 B2 | 8/2017 | Burch et al. | |
| 2005/0050159 A1* | 3/2005 | Suraski ................. | G06F 11/362 709/217 |
| 2006/0259828 A1 | 11/2006 | Swoboda | |
| 2009/0165111 A1 | 6/2009 | Zhang et al. | |

(Continued)

OTHER PUBLICATIONS

U.S. Appl. No. 13/728,224, filed Dec. 27, 2012, Techniques for Secure Debugging and Monitoring, U.S. Pat. No. 9,172,701.

(Continued)

*Primary Examiner* — Izunna Okeke

(74) *Attorney, Agent, or Firm* — Schwegman Lundberg & Woessner, P.A.

(57) ABSTRACT

Techniques for secure debugging and monitoring are presented. An end user requests a secure token for logging information with a remote service. A secure monitoring and debugging token service provides the secure token. The remote service validates the secure token and configures itself for capturing information and reporting the captured information based on the secure token.

17 Claims, 6 Drawing Sheets

(56) References Cited

U.S. PATENT DOCUMENTS

| | | | |
|---|---|---|---|
| 2010/0083386 A1* | 4/2010 | Kline | G01R 31/31705 726/34 |
| 2010/0299467 A1 | 11/2010 | Yoon | |
| 2013/0054968 A1 | 2/2013 | Gupta | |
| 2014/0189775 A1 | 7/2014 | Burch et al. | |
| 2016/0021113 A1 | 1/2016 | Burch et al. | |

OTHER PUBLICATIONS

U.S. Appl. No. 14/867,255, filed Sep. 28, 2015, Techniques for Secure Debugging and Monitoring, U.S. Pat. No. 9,723,007.

U.S. Appl. No. 13/728,224, Non Final Office Action, dated Jan. 3, 2014, 8 pgs.

U.S. Appl. No. 13/728,224, Response filed Apr. 3, 2014 to Non Final Office Action dated Jan. 3, 2004, 8 pgs.

U.S. Appl. No. 13/728,224, Final Office Action dated Jun. 26, 2014, 9 pgs.

U.S. Appl. No. 13/728,224, Response filed Aug. 26, 2014 to Final Office Action dated Jun. 26, 2014, 8 pgs.

U.S. Appl. No. 13/728,224, Advisory Action dated Sep. 8, 2014, 2 pgs.

U.S. Appl. No. 13/728,224, Non Final Office Action dated Oct. 21, 2014, 9 pgs.

U.S. Appl. No. 13/728,224, Response filed Jan. 21, 2015 to Non Final Office Action dated Oct. 21, 2014, 7 pgs.

U.S. Appl. No. 13/728,224, Final Office Action dated Feb. 20, 2015, 9 pgs.

U.S. Appl. No. 13/728,224, Response filed Apr. 20, 2015 to Final Office Action dated Feb. 20, 2015, 8 pgs.

U.S. Appl. No. 13/728,224, Advisory Action dated Apr. 30, 2015, 2 pgs.

U.S. Appl. No. 13/728,224, Notice of Allowance dated Jun. 26, 2015, 10 pgs.

U.S. Appl. No. 14/867,255, Preliminary Amendment filed Sep. 30, 2015, 6 pgs.

U.S. Appl. No. 14/867,255, Non Final Office Action dated Nov. 18, 2016, 8 pgs.

U.S. Appl. No. 14/867,255, Response filed Feb. 27, 2017 tp Non Final Office Action dated Nov. 18, 2016, 6 pgs.

U.S. Appl. No. 14/867,255, Notice of Allowance dated Mar. 27, 2017, 8 pgs.

* cited by examiner

TECHNIQUES FOR SECURE DEBUGGING AND MONITORING

This application is a continuation of U.S. patent application Ser. No. 14/867,255, filed Sep. 28, 2015, now issued as U.S. Pat. No. 9,723,007, which is a continuation of U.S. patent application Ser. No. 13/728,224, filed Dec. 27, 2012, now issued as U.S. Pat. No. 9,172,701, each of which is incorporated herein by reference in its entirety.

BACKGROUND

Enterprises may rely on end-users or developers to assist in tracking and resolving issues with services provided by the enterprises. However, this may create a problem when detailed information is displayed to the end user. In fact, it is common for hackers to use debug information to break the security of a system. Thus, by providing this type of control to the end-users, the enterprises may expose their systems to security risks.

From a business perspective, there may be periods of time where an increased level of tracking is required as result of: a business concern, troubleshooting a system issue, behavior pattern deviances, and/or other potential security risks. There are several problems created when web services need to provide more debug and monitoring information. If an administrator turns on advanced debugging or monitoring for the system, then too much data may be generated, which can cause the enterprise service to appear unresponsive or broken. Additionally, the amount of information generated may result in storage problems; or create a security vulnerability by exposing sensitive information.

So, an administrator may want to vary end-user monitoring based on the security risk of individuals or the administrator may want to allow end users to influence how much debugging or monitoring is done on their accounts. This is typically achieved by placing a cookie on the browser that turns on "debug" or "monitoring" to a specific level. The cookie can be set automatically, or set by the end user that selects an option to enable debugging. The problem is that there is often no security on the cookie set. Basically, any user can set any cookie on any browser once he/she has seen the cookie, which means a hacker can set the same cookie thereby enabling debug, which may disclose information about the system that can be used to break in that system (creating a security hole). It is also well known that the set of values of a cookie used for enabling debugging capabilities is commonly posted on hacker web sites.

Another common problem with uncontrolled or unsecure debugging and monitoring is that the browser view, which is viewed by an end user comes from many web services; some of which may not be owned or operated by the end user's company. A simple cookie that is used to enable advanced debug information does not have enough data or security for an external web service to trust the request and send advanced debug or monitoring data.

SUMMARY

Various embodiments of the invention provide techniques for secure debugging and monitoring. In an embodiment, a method for secure debugging is presented.

Specifically, selections for logging information with a remote service are received. Next, a policy is evaluated to determine whether the selections are permissible. Finally, a secure token is generated that identifies a principal, the remote service, and the selections permitted by the policy.

DETAILED DESCRIPTION

Figure 1A:
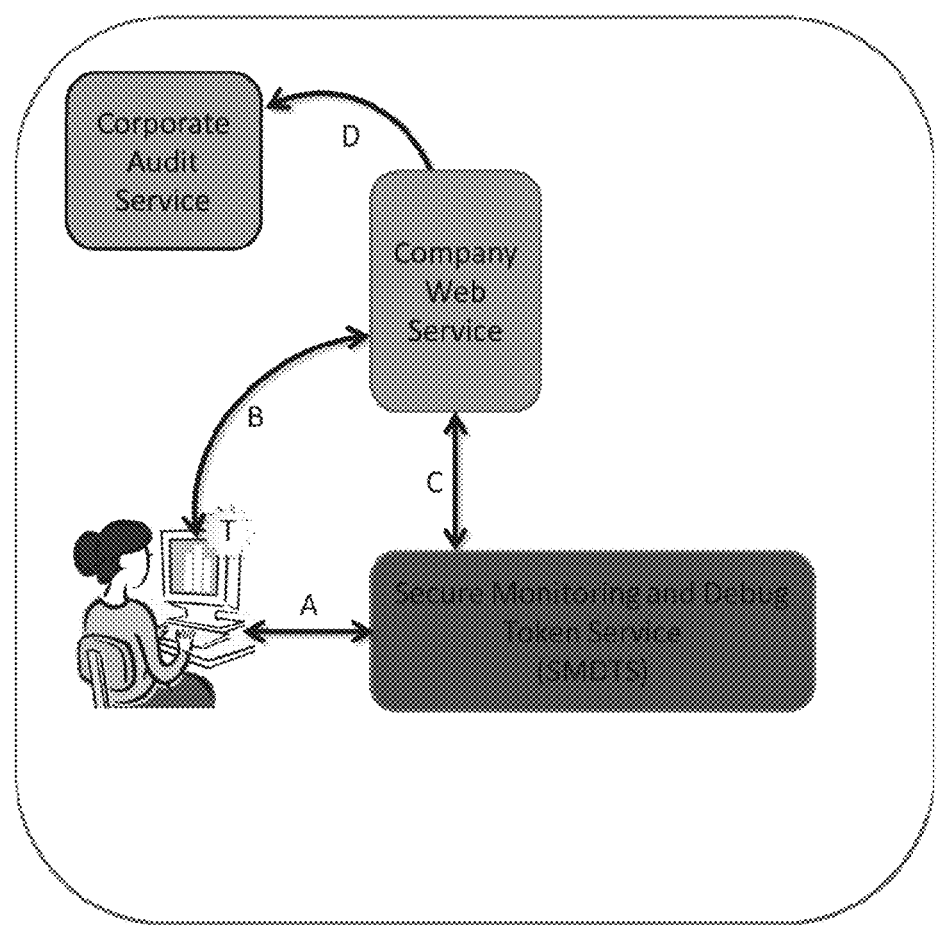
FIGS. 1A-1C are diagrams depicting example techniques for secure debugging, according to example embodiments presented herein.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Figure 1B:
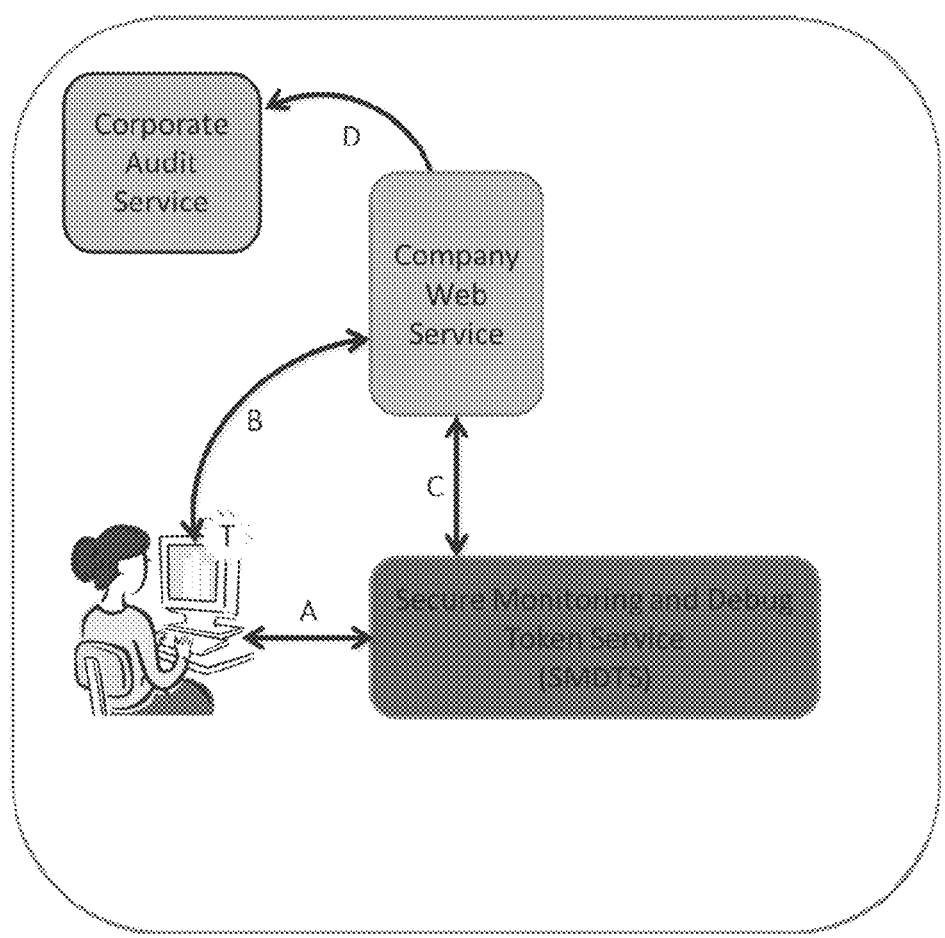
Figure 1C:
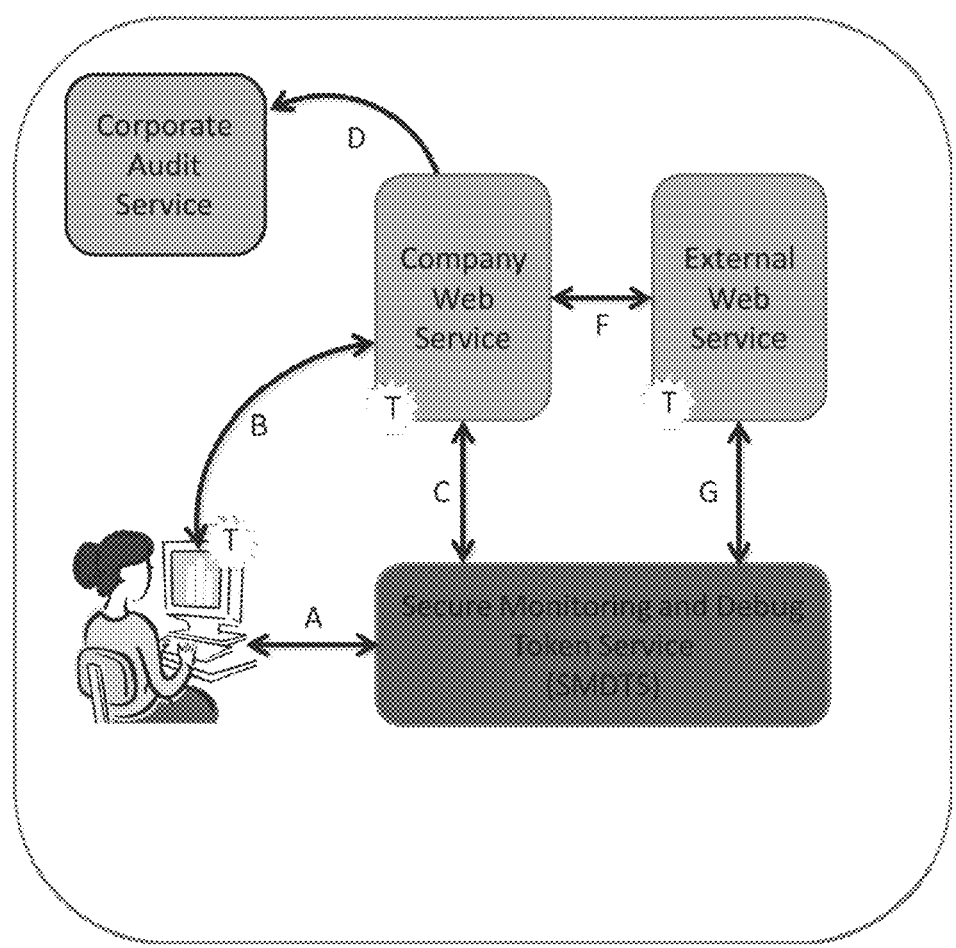

FIGS. 1A-1C are diagrams depicting example techniques for secure debugging, according to example embodiments presented herein. The technique include a variety of components that is implemented, programmed, and resides within memory and/or a non-transitory machine-readable storage medium that executes on one or more processors of a network. The network may be wired, wireless, or a combination of wired and wireless.

It is noted that the components and interactions of the FIGS. 1A-1C are presented for purposes of illustration and that other arrangements including more or less components are possible without departing from the teachings provided herein.

A tenet of the embodiments presented herein with respect to providing debugging and monitoring security is to provide just enough debug or monitoring data, to those that have a need and also have the rights to see and use the data. Information generation can be done automatically by policy; selected by the end user that is controlled by policy; and/or controlled by the administrator.

The techniques herein solve the problem described above by using a "Secure Monitoring and Debug Token Service" (SMDTS and as shown in the FIGS. 1A-1B). Tokens made by the SMDTS (or other entities as discussed below) are open standard federation tokens (in some embodiments) having information that controls what level of debugging and monitoring information is produced, and where to send the information. These tokens can be signed by: the SMDTS, and/or a trusted authority and, the tokens may define identity, roles and other needed data. The tokens may be stored as the value of a cookie on the browser, included in headers, and/or other means. The token may also be limited to the scope of a single browser session, a single user, and/or a web service and, the token may have a limited time to live. Because the tokens are signed, optionally encrypted and have controlled limited use, reuse and spoofing is controlled. It is noted that the SMDTS does not do any logging or monitoring; the service just provides an enabling token to web services that actually do the logging or data production.

The FIGS. 1A-1C depict some data flows showing how various embodiments of the invention are to work. This is presented for purposes of illustration and comprehension and is not intended to specifically limit other embodiments derived from the teachings presented herein and below.

The FIG. 1A shows how processing begins with an end user that is connected to a company web service and the SMDTS. The end user (working on a client device) using a browser (or other enterprise network client service, such as an app) obtains a token from the SMDTS. This can be achieved in a variety of ways.

For example, the user can go directly to the SMDTS, via A, and selects particular options for receiving a token for debugging and/or monitoring with respect to the Company Web Service.

It is noted that although the FIGS. 1A-1C are discussed from the perspective of a web browser and a web service, this does not have to always be the case, as the end user can have a mobile client device, such as a phone or tablet, which uses an app to interact with a remote service provided to that app (the remote service being the Company Web Service).

In another case, the user, using the client service, interacts directly with the Company Web Service and then is redirected, via B through A, to the SMDTS with a request for a token.

In still another embodiment, the user, using the client service, interacts directly with the Company Web Service and the Company Web Service sends a request for the token (via C) on behalf of the user to the SMDTS. The token returned by the SMDTS is then sent back to the user, via the client service, using B.

At this point, the user, via the client service, is in possession of or is associated with a secure token.

The FIG. 1B shows how the token is validated and used to configure the Company Web Service for debugging and/or monitoring.

Specifically, the token is sent by the client service of the user (such as via a browser or mobile app) to the Company Web Service via B. The token is then used to determine what debugging/logging (monitoring data) to send, via D, to a remote Corporate Audit Service (or third party service) and/or to the client service via B on the client device of the end user. The information (debugging or monitoring) can then be written to an audit system and/or may be output to the end user's console via headers or display. A few examples of this can be achieved is as follows:

The Company Web Service (CWS) inspects and evaluates the token, validates the token, and enables an appropriate level of debugging/logging. In an embodiment, the token type is a Security Assertion Markup Language (SAML) token.

In another case, the Company Web Service sends the token to the SMDTS, via C. The SMDTS validates the token and returns to the CWS the debugging/logging levels. Secure Socket Layer (SSL) communication may be used to ensure security and validate the identity of the SMDTS. Again, example token types can include SAML and OAuth (Open standard for Authorization).

The FIG. 1C shows an alternative arrangement (to the FIG. 1C) that uses one more additional external services for identifying the debugging/logging levels for the end user.

The FIG. 1C shows an embodiment where the Company Web Service uses the token to interact with another External Web Service, via F. The External Web Service can use the token to determine the debugging/logging level to use for the end user in the following manners.

The External Web Service understands the token and validates the token. Once this is done, the External Web Service enables the debugging/logging levels for the end user. Again, the token type can be a SAML token.

In another situation, the External Web Service sends the token, via G, to the SMDTS. The SMDTS validates the token and returns the debugging/logging levels. SSL may be used for secure communications and to validate an identity for the SMDTS. Again, the token types can include SAML and OAuth.

The FIGS. 1A-1C shows how logging (monitoring) and debugging can be secured by preventing unauthorized access. This can be achieved via open standard federation tokens. Moreover, the techniques allow for logging/debugging information to be passed to third party web service(s) while maintaining a secure and trusted relationship. It does not require the calling application to setup this trust but uses another trust relationship that both parties agree on.

Still further, the techniques herein provide identity and policy to determine the logging/debug levels allowed by a user. This allows policy to control how and by whom debugging/logging information is controlled.

The techniques also allow for disparate party applications (cooperating web services in a variety of deployment locations) to have a single debugging and logging policy.

Further, the techniques allow a third party to control debugging and logging information.

As will be demonstrated more completely herein, the techniques allow for the selective control of debugging/logging information content. (For example, information may be selected or excluded by a specific type of request, a request from a specific device or service as indicated by the device address or service identifying information, a time based constraint or other constraining criteria uniquely identifying the information, device or service involved.)

Still further, the techniques herein reduce the volume of information amassed in logging/auditing storage. The techniques also allow for dynamic change of logging/debugging policies within a communication session.

Figure 2:
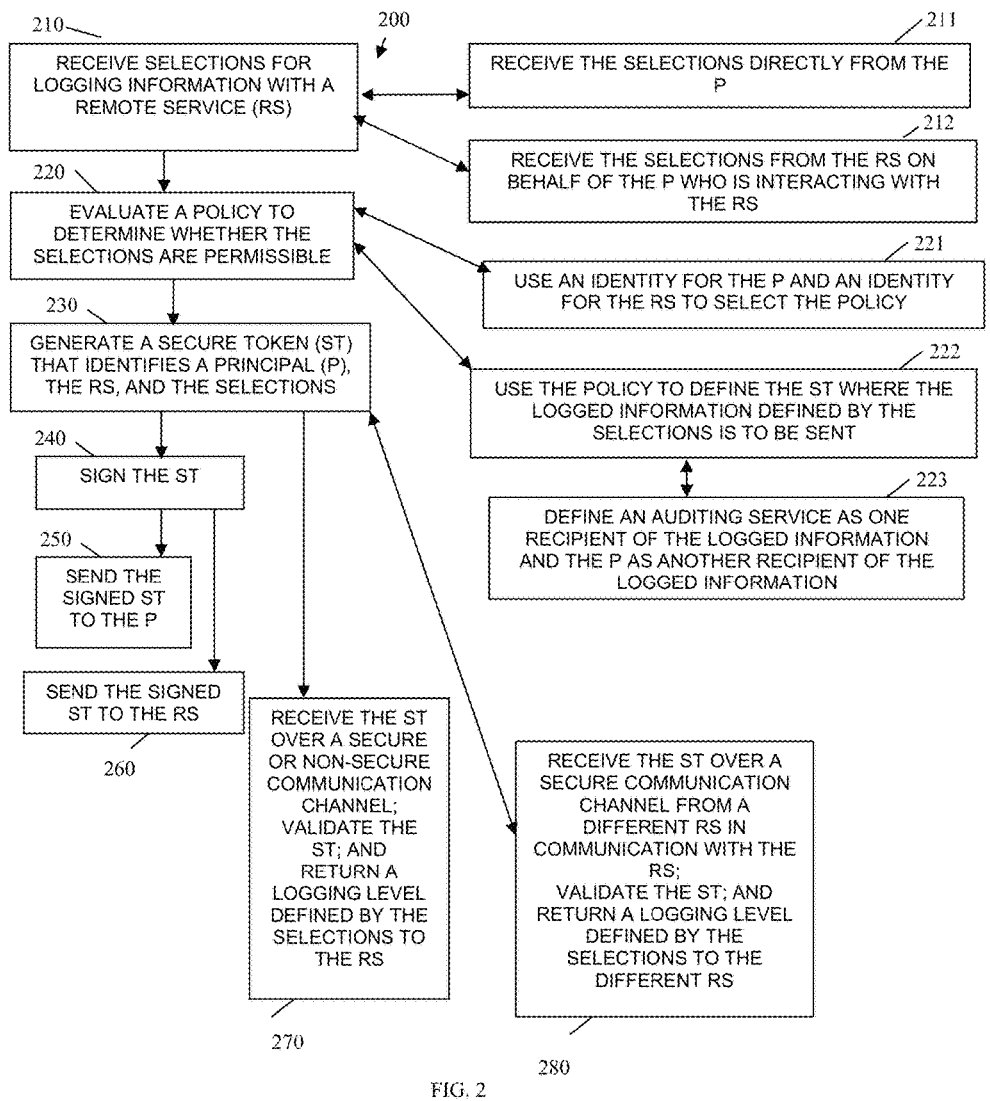
FIG. 2 is a diagram of a method for secure logging, according to an example embodiment presented herein.

FIG. 2 is a diagram of a method 200 for secure logging, according to an example embodiment presented herein. The method 200 (herein after referred to as "SMDTS") is implemented, programmed, and resides within memory and/or a non-transitory machine-readable storage medium that executes on one or more processors of a device and is operational over a network. The network may be wired, wireless, or a combination of wired and wireless.

At 210, the SMDTS receives selections for logging information with a remote service.

It is noted that as used herein the phrases "remote service," "remote network logging service," and "logging service" may be used interchangeably and synonymously. These entities provide any type of remote service to the user, such as a web service or a mobile device app service. In addition, a portion of the entities provides debugging or monitoring via logging information. How logging is initiated, what is captured during the logging, and where the resulting captured logging information is sent for evaluation are discussed herein.

According to an embodiment, at 211, the SMDTS receives the selections directly from a principal. Again, it is noted that a principal can be an end user or an automated service. In this embodiment, the SMDTS provides an interface for the principal (can be Application Programming Interface (API) when the principal is an automated service) to make the selections. The selections identify what types of logging information is captured, the frequency of capturing the logging information, instructions as to where to send the captured logging information, and the like.

Alternatively, at 212, the SMDTS receives the selections from the remote service on behalf of the principal who is interacting or who will be interacting at some point with the remote service. Here, the remote service provides an interface or API for the principal to make the selections. However, in some cases, an administrator makes the selections for the principal and it may actually be that the principal is completely unaware of the selections and the soon-to-be secure logging. This latter situation may be useful for auditing a principal for compliance or if the principal is suspected of unscrupulous activity on the remote service. In still another case, under 212, it may be that policy on the remote service defines or makes the selections on behalf of the principal and the remote service then provides the selections to the SMDTS.

At 220, the SMDTS evaluates a policy to determine whether the selections are permissible. What conditions are defined in the policy and how the policy is initially selected or obtained can be configured situations.

For example, at 221, the SMDTS uses an identity for the principal and an identity for the remote service to select the policy from a library of available policies. It may be that attributes and/or settings are used by the SMDTS to modify a template to create the policy dynamically based on the identities as well. So, the policy can be predefined or dynamically configured based on identity-based limitations.

In an embodiment, at 222, the SMDTS uses the policy to define in or with the secure token where the logged information that is defined by the selections is to be sent. That is, the secure token can be used to define where captured logged information is sent based on the policy conditions.

Continuing with the embodiment of 222 and at 223, the SMDTS defines an auditing service as one recipient of the logged information and the principal as another recipient of the logged information. It is noted that in some cases, the principal may receive the logged information via a principal or client-based service executing on a mobile client device of the principal. This can be an app on a mobile device of the principal.

At 230, the SMDTS generates a secure token that identifies the principal, the remote service, and the selections. The secure token can be encrypted or can be mapped by just the SMDTS to specific logging levels for the selections (as permitted by policy).

According to an embodiment, at 240, the SMDTS digitally signs the secure token.

Continuing with the embodiment of 240 and at 250, the SMDTS sends the signed secure token to the principal. At this point, the principal has a secure encrypted and signed token that needs to be possessed by the principal to be useful; so the likelihood of nefarious activity by an eavesdropper is substantially reduced; thereby providing increases security for debugging and monitoring.

Still continuing with the embodiment of 240 and at 260, the SMDTS sends the signed secure token directly to the remote service on behalf of the principal. This is a situation where the remote service requests the secure token on behalf of the principal and was discussed above with the discussion of the FIGS. 1A-1C.

In an embodiment, at 270, the SMDTS receives the secure token over a secure communication channel, such as SSL. In some cases, the secure token can also be delivered over a non-secure channel. Next, the SMDTS validates the token (authentication can also occur with respect to the sender and purported principal of the secure token). Finally, the SMDTS returns a logging level defined by the selections to the remote service. So, the mapping of the logging level to the secure token can be entirely controlled by the SMDTS and provided on demand to the remote service that then configures itself for capturing the logging information during interactions with the principal.

Figure 3:
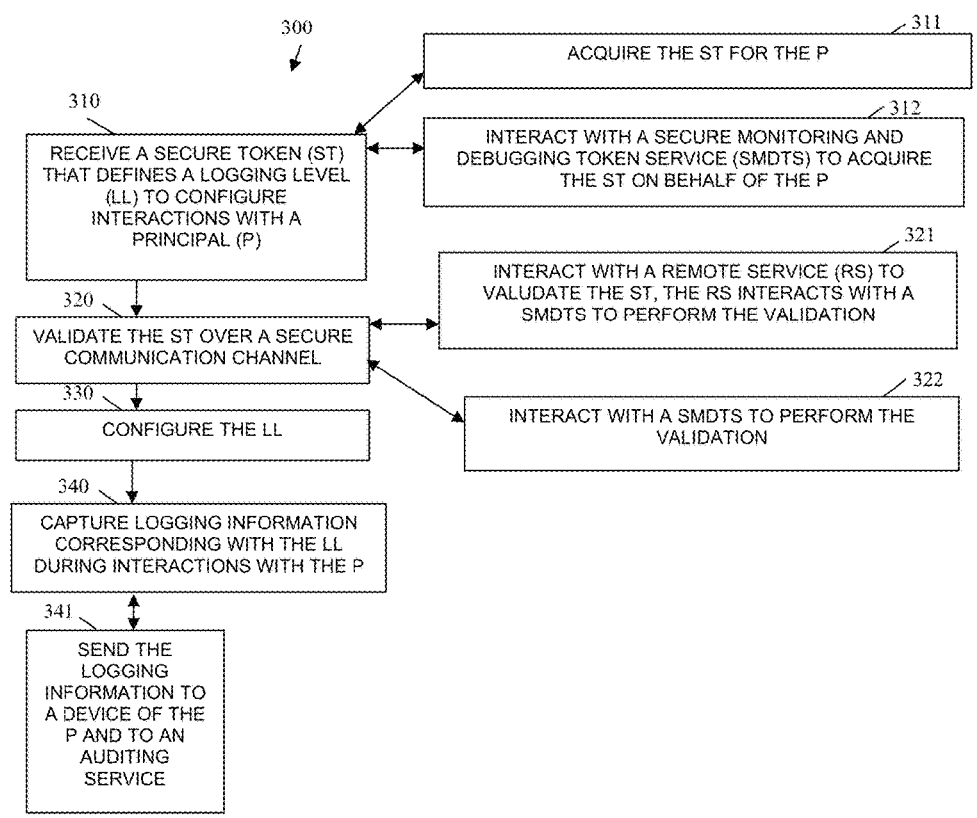
FIG. 3 is a diagram of another method for secure logging, according to an example embodiment.

Processing from the perspective of the remote service is now presented with the discussion of the FIG. 3.

FIG. 3 is a diagram of another method 300 for secure logging, according to an example embodiment. The method 300 (herein after referred to as "remote network logging service") is implemented, programmed, and resides within memory and/or a non-transitory machine-readable storage medium that executes on one or more processors of a server and is operational over a network. The network may be wired, wireless, or a combination of wired and wireless.

The remote network logging service is presented from the perspective of a network service that provides secure logging, such as, but not limited to the Company Web Service presented above with respect to the FIGS. 1A-1C. The remote network logging service interacts with the SMDTS (presented in the FIGS. 1A-1C and 2 above).

At 310, the remote network logging service receives a secure token that defines a logging level to configure for interactions with a principal. Again, the principal can be an end user or can be an automated service. The interactions can occur via a browser or via a mobile app with the principal. The "logging level" defines the types of logging information to capture, the frequency of capturing the types of logging information or events for which the types of logging information are to be captured, and/or where and when to send the captured logging information.

According to an embodiment, at 311, the remote network logging service acquires the secure token from the principal. Here, the principal may be authenticated via the secure token as well. Moreover, it may be that the secure token is signed by the principal (in addition to having signatures of other entities such as the SMDTS).

In another case, at 312, the remote network logging service interacts with a SMDTS (see above discussion with respect to the FIGS. 1A, 1B, 1C, and 2) to acquire the secure token on behalf of the principal. Here, a signature of the secure token for the SMDTS may be validated as well and the SMDTS may be received over a secure channel (SSL, Virtual Private Network (VPN), and the like).

At 320, the remote network logging service validates the secure token over a secure communication channel. Here, the remote network logging service uses a service, such as (but not necessarily required see the processing of 321) the SMDTS (see 322 below) to validate the secure token on behalf of the remote network logging service.

In an embodiment, at 321, the remote network logging service interacts with a remote service to validate the secure token. This remote service then interacts with a SMDTS to perform the validation of the secure token (see the FIG. 1C above and its corresponding discussion).

In another case, at 322, the remote network logging service interacts with the SMDTS to perform the validation of the secure token (see the FIG. 1B above and its discussion).

At 330, the remote network logging service configures the logging level within the remote network logging service or other services related to or within the control of the remote network logging service. At this point, the remote network logging service is ready to interact with the principal and capture information defined by the logging level.

Thus, according to an embodiment, at 340, the remote network logging service captures the logging information corresponding with the logging level during interactions with the principal.

Continuing with the embodiment of 340 and at 341, the remote network logging service sends the logging information to the device of the principal and to an auditing service (which may or may not be part of the remote network logging service). The captured logging information may itself be encrypted before being sent to the principal. Moreover, a secure communication channel can be used to send either the encrypted or unencrypted logging information. Still further, the remote network logging service may send the principal a temporary id and password to use to log onto a temporary secure site to acquire the logging information (the principal may be required to sign on and acquire the logging information with a predefined time or with a time range).

Figure 4:
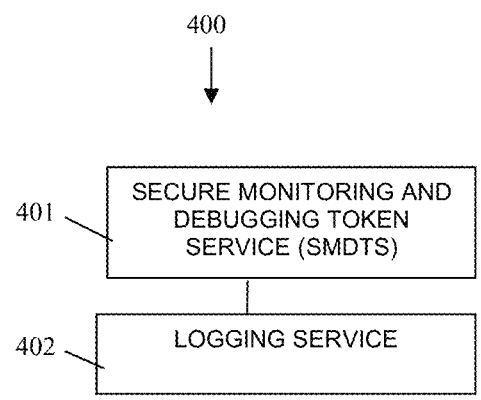
FIG. 4 is a diagram of a secure logging system, according to an embodiment.

FIG. 4 is a diagram of a secure logging system 400, according to an embodiment. The components of the secure logging system 400 are implemented as executable instructions that reside within memory and/or non-transitory computer-readable storage media and those instructions are executed by one or more devices. The components and the devices are operational over a network and the network can be wired, wireless, or a combination of wired and wireless.

According to an embodiment, the secure logging system 400 implements, inter alia, the features of the FIGS. 1A-1C and 2-3.

The secure logging system 400 includes a SMDTS 401 and a remote network logging service 402. Each of these and their interactions with one another will not be discussed in turn.

The secure logging system 400 includes a first device having memory configured with SMDTS 401. Example processing associated with the SMDTS 401 was presented above in detail with reference to the FIGS. 1A-1C and 2.

The SMDTS 401 is configured to generate a secure token based on a policy evaluation that defines a logging level for the remote logging service 402 to use when interacting with a principal and wherein the SMDTS 401 is configured to validate the secure token for the logging service 402.

According to an embodiment, the SMDTS 401 is further configured to sign the secure token.

The secure logging system 400 includes a second device having memory configured with remote network logging service 402. Example processing associated with the remote network logging service 402 was presented above in detail with reference to the FIGS. 1A-1C and 3.

The remote network logging service 402 is configured to capture logging data in accordance with the logging level and report the logging data to an auditing service.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   obtaining, by executable instructions that execute on a hardware processor, selections that identify a debugging level of detail for debugging a resource controlled by a service, wherein obtaining further includes: verifying the selections are permissible based on a principal identity for the principal and a service identity for the service and enforcing a policy for determining whether the selections are permissible for the principal;
   providing, by the executable instructions, a token to a principal associated with the selections, wherein providing further includes generating the token as a security token that defines a limited scope of usage for a single session of the principal and includes a limited time to live;
   validating, by the executable instructions, the principal in response to the token being presented by the service; and
   identifying, by the executable instructions, the debugging level of detail for the service from the token.

2. The method of claim 1, wherein providing further includes generating the token for identifying the principal, the service, and the debugging level.

3. The method of claim 2, wherein generating further includes digitally signing the token.

4. The method of claim 3, wherein digitally signing further includes encrypting the token.

5. The method of claim 1, wherein providing further includes providing the token as a security assertion to the principal.

6. The method of claim 1, wherein providing further includes providing the token over a secure communication channel to the principal.

7. The method of claim 1, wherein validating further includes receiving the token from the service along with a principal identifier over a secure communication channel.

8. The method of claim 1, wherein validating further includes receiving the token from the service along with a principal identifier over an insecure communication channel.

9. A method, comprising:
obtaining, by executable instructions that execute on a hardware processor, a token from a principal associated with debugging a resource;
providing, by the executable instructions, a principal identifier and the token to a network debugging service, wherein providing further includes providing the token as a limited scope of usage token for a single session of the principal that includes a limited time to live, wherein providing further includes providing the principal identifier and the token to the network debugging service for authenticating the token and obtaining the specific level of debugging that is associated with the token;
verifying, by the executable instructions, with the network debugging service a specific level of debugging that the principal is permitted to access; and
providing, by the executable instructions, the principal access to debug the resource using the specific level of debugging in response to the verifying and configuring the resource to log data at the specific level of debugging when interacting with the principal.

10. The method of claim 9, wherein obtaining further includes authenticating the principal for access to the resource.

11. The method of claim 10, herein authenticating further includes authenticating the principal over a secure communication channel.

12. The method of claim 9, wherein providing the principal identifier further includes providing the principal identifier and the token to the network debugging service over an insecure communication channel.

13. The method of claim 9, wherein providing the principal identifier further includes providing the principal identifier and the token over secure communication channel.

14. The method of claim 9 further comprising, providing, by the executable instructions, the log data to the principal as the log data is captured for the resource.

15. The method of claim 14 further comprising, sending by the executable instructions, the log data to an auditing service.

16. A system, comprising:
at least one hardware processor of a first server, wherein the at least one hardware processor executes executable instructions representing configure a debugging token service from a non-transitory computer-readable storage medium of the first server; and
at least one hardware processor of a second server, wherein the at least one hardware processor executes executable instructions representing a debugging service from a non-transitory computer-readable storage medium of the first server, and wherein the debugging service configured to provide debugging operations for a resource being debugged by a principal from a principal operated device;
wherein the debugging token service is configured to provide a token to the principal, the token as a limited scope of usage token for a single session of the principal that includes a limited time to live and that identifies the resource, the principal, and a specific debugging level that the principal is authorized to debug the resource, wherein the debugging service is configured to authenticate the principal for access to the resource, validate the token with the debugging token service, obtain the specific debugging level from the debugging token service, configure the resource for logging data at the specific debugging level, and provide the principal access to debug the resource at the specific debugging level.

17. The system of claim 16, wherein the debugging token service is further configured to generate the token based on the principal, the resource, and a policy that identifies the specific level of debugging.

* * * * *

UNITED STATES PATENT AND TRADEMARK OFFICE
CERTIFICATE OF CORRECTION

PATENT NO. : 10,171,470 B2
APPLICATION NO. : 15/664165
DATED : January 1, 2019
INVENTOR(S) : Burch et al.

Page 1 of 1

It is certified that error appears in the above-identified patent and that said Letters Patent is hereby corrected as shown below:

On the Title Page

On page 2, in Column 2, item (56) under "Other Publications", Line 19, delete "tp" and insert --to-- therefor In the Claims In Column 9, Line 38, in Claim 11, delete "herein" and insert --wherein-- therefor In Column 10, Line 7, in Claim 15, after "sending", insert --,--

In Column 10, Line 13, in Claim 16, after "representing", delete "configure"

Signed and Sealed this
Twelfth Day of May, 2020

Andrei Iancu
*Director of the United States Patent and Trademark Office*